US006443237B1

(12) United States Patent
Myers et al.

(10) Patent No.: US 6,443,237 B1
(45) Date of Patent: Sep. 3, 2002

(54) MINIMUM TILLAGE RIPPER POINT WITH FIN

(75) Inventors: Brian E. Myers, Altoona; David Lee Steinlage, Ankeny, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/828,529

(22) Filed: Apr. 6, 2001

(51) Int. Cl.$^7$ .............................................. A01B 13/08
(52) U.S. Cl. ...................................................... 172/730
(58) Field of Search ................................ 172/156, 196, 172/699, 700, 720, 721, 722, 724, 730

(56) References Cited

U.S. PATENT DOCUMENTS

| 774,324 A | 11/1904 | Hill et al. | |
|---|---|---|---|
| 1,603,486 A | 10/1926 | Mock | |
| 4,415,042 A | 11/1983 | Cosson | 172/749 |
| 4,538,689 A | 9/1985 | Dietrich, Sr. | 172/700 |
| 5,161,472 A | * 11/1992 | Handy | 111/73 |
| 5,165,487 A | 11/1992 | Williams et al. | 172/699 |
| 5,437,337 A | 8/1995 | Dietrich, Sr. | 172/196 |
| 5,499,686 A | 3/1996 | Parker | 172/730 |
| 5,540,288 A | 7/1996 | Dietrich, Sr. | 172/196 |
| 6,012,534 A | 1/2000 | Kovach et al. | 172/196 |

FOREIGN PATENT DOCUMENTS

CA          654848       * 12/1962    ................. 172/699

OTHER PUBLICATIONS

DMI Inc., Tiger–Two Disc Conservation Tillage Tool brochure, two pages, date stamped Sep. 1988, published in the U.S.A.
Deere & Company, Agricultural Marketing Information Bulletin 99–6–16, two pages, dated May 7, 1999, published in U.S.A.

* cited by examiner

Primary Examiner—Robert E. Pezzuto

(57) ABSTRACT

A deep tillage ripper point includes an aggressive long, narrow leading point portion with a top surface that forms a steep angle of approximately 40–50 degrees with the horizontal. An intermediate portion has a top surface and wings extending at a relatively shallow angle of about 15 degrees relative to the horizontal. A centrally located vertical fin having a width of about half the width of the leading point portion and approximately equal to the width of the ripper shank extends upwardly from the leading point portion rearwardly and above the forward edge and forwardly of the leading edges of the wings. Pre-fracturing action of the fin initiates substantial lateral displacement of the soil prior to the soil contacting the wings. The fin reduces violent vertical eruption of the soil when contacted by the wings and provides improved soil profile.

20 Claims, 4 Drawing Sheets

MINIMUM TILLAGE RIPPER POINT WITH FIN

FIELD OF THE INVENTION

The present invention relates to deep tillage tools for agricultural implements such as rippers, and more specifically to a ripper point for such an implement.

BACKGROUND OF THE INVENTION

In the past, straight shank rippers have been used to fracture soil without substantial destruction of the soil surface. These rippers were designed to eliminate soil compaction without inverting soil layers or significantly disturbing the surface residue. Farmers want to have the root growth and water movement benefits from ripping the soil without being penalized with a loose, uneven surface profile in the spring. Ripper points designed to reduce surface profile variability are shown, for example, in U.S. Pat. Nos. 5,437,337 and 5,540,288. The points leave the surface profile substantially undisturbed by not displacing fractured soil. Because the points are designed to leave surface profile generally unchanged, soil fracturing in the compaction layer is at a minimum. With little lateral movement of soil, the fracture zone is only a slot, and water intake and retention properties are compromised. An optimum soil profile for promoting good root growth and water infiltration/retention is also compromised by the limited soil fracture characteristics of points that have little fractured soil displacement.

Many of the presently available ripper points have shallow leading angles which are inadequate to allow tool penetration in hard and/or tight soils. It is not uncommon for operators to adjust the machine out of an optimal level working condition to get the points to enter and remain in the hard or tight soils. This improper adjustment of the machine to achieve better penetration results in deteriorated ripper action and premature point wear. Inconsistent depth can also result from the lack of a vertical force holding the ripper point below the soil compaction layer. Wear life of the points is very short because the penetration ability of the point deteriorates rapidly as wear occurs. Therefore, the points often have to be replaced before they are fully worn away.

A type of tillage sweep shown in U.S. Pat. No. 5,499,686 assigned to Deere & Company includes a wide point having a width of about 2.5 inches and an attack angle of approximately thirty degrees provides for good soil action. The surfaces of the wings have a shallower angle than the point and include leading and trailing edges generally parallel to the ground surface to reduce soil disturbance. However, in some soil conditions, the sweep can cause considerable soil surface change and require an additional pass of a leveling implement such as a field cultivator prior to planting.

SUMMARY OF THE INVENTION

It is therefore an object of the present invention to provide an improved deep tillage ripper point. It is a further object to provide such a point which overcomes most or all of the above problems.

It is another object of the present invention to provide an improved ripper point which maximizes soil fracture without creating excessive soil surface disturbance. It is a further object to provide such a point which leaves a relatively level soil surface profile in a variety of soil conditions. It is yet another object to provide such a point which lasts longer than most or all of the previously available points while maintaining its effective working width and soil fracturing and penetrating abilities over substantially all of its wear life.

It is still another object of the present invention to provide an improved deep tillage point for a ripper or similar agricultural implement which has improved penetration ability when compared to at least most previously available ripper points. It is another object to provide such a point which provides necessary vertical force to maintain a consistent depth while working in a compaction layer.

It is another object to provide a ripper point which leaves the surface profile level enough in the fall to eliminate a tillage pass in the spring and even allows for spring no-till farming, if desired. It is a further object to provide such a ripper point that benefits the farmer by making a favorable soil profile for vigorous root growth, by eliminating all or some spring tillage passes, and by increasing water intake and retention capabilities of the soil profile compared to available low surface profile disturbance points.

A ripper point constructed in accordance with the teachings of the present invention includes a narrow leading point portion having a width on the order of 1.33 inches. The top surface of the leading point portion forms an angle in the range of approximately 40–50 degrees with the horizontal when the point is in the field working position. The leading point portion curves rearwardly from a forward edge to an intermediate portion having a top surface which extends at an angle of approximately 15 degrees relative to the horizontal. Wings extend outwardly and slightly downwardly from the intermediate portion and have a top surface which forms a continuation of the top surface of the intermediate portion. The wings also form an angle of approximately 15 degrees relative to the horizontal.

A centrally located vertical fin having a width of approximately half the width of the leading point portion extends upwardly from the leading point portion rearwardly and above the forward edge and forwardly of the leading edges of the wings. The fin projects a small distance above top surface of the leading point portion and then curves upwardly at a location near the forward extremities of the wings and extends rearwardly to a terminating location generally coextensive with trailing edges of the wings. The bottom of the leading point portion extends rearwardly and upwardly from the forward edge at an angle with the horizontal substantially less than that of the top surface of the point portion to define side profile which increases in height from the forward edge to the intermediate portion. The bottom of the intermediate portion extends rearwardly in generally a horizontal attitude to a rearmost point location behind the rear edges of the fin and the wings and is bifurcated to define a shank-receiving area generally behind the rear edge of the fin. The point is attached to the lower end of a shank by bolt structure. The sides of the bifurcated end embrace the sides of the shank and position the rear edge of the fin closely adjacent the front edge of the shank.

The leading point construction helps provide good point ground entry and vertical holding force in the compaction layer. The fin pre-fractures soil and initiates substantial lateral displacement of the soil prior to the soil coming into contact with the wings. The fin also parts the soil before the soil contacts the shank. The wings lift the soil and provide additional fracturing above and outwardly of the point. Soil fracturing in the compaction layer is maximized to provide better fracture percentages for improved water penetration and retention and increased root growth. The point profile establishes the vertical force necessary to maintain a consistent working depth within the compaction layer.

The relatively shallow angle of the wings as compared with many previous points having an attack angle of up to approximately 30 degrees reduces soil surface disturbance in a variety of soil conditions. The narrow point, which is approximately half the width of a typical previously available point, also helps reduce soil surface disturbance. Further reduction of surface disturbance is achieved by the pre-fracturing action of the fin in the compaction layer which substantially reduces violent vertical eruption of the soil when contacted by the wings and the shank. This pre-fracturing action provides substantial initial lateral displacement of the soil, prior to wing contact, and reduces shank wear and drag. The increased lateral displacement compared to most previously available low disturbance points provides an improved soil profile for improved root growth, water infiltration and water retention.

The point is preferably cast from austempered ductile iron for long life. The wings have a parallelogram shape to provide consistent width as the leading edges wear away. The aggressive downward and forward angle of the leading point, in addition to providing excellent penetration of hard or tight soils throughout the life of the point, is designed with a sufficient amount of material to wear out at the same time as the wings, thereby maximizing material utilization and providing consistent ripping performance for the entire wear life of the point. The point design achieves the improved fracturing, depth retention and wear life while still retaining a satisfactory soil surface profile.

These and other objects, features and advantages of the present invention will become apparent to one skilled in the art upon reading the following detailed description in view of the drawings.

DESCRIPTION OF THE PREFERRED EMBODIMENT

Figure 1:
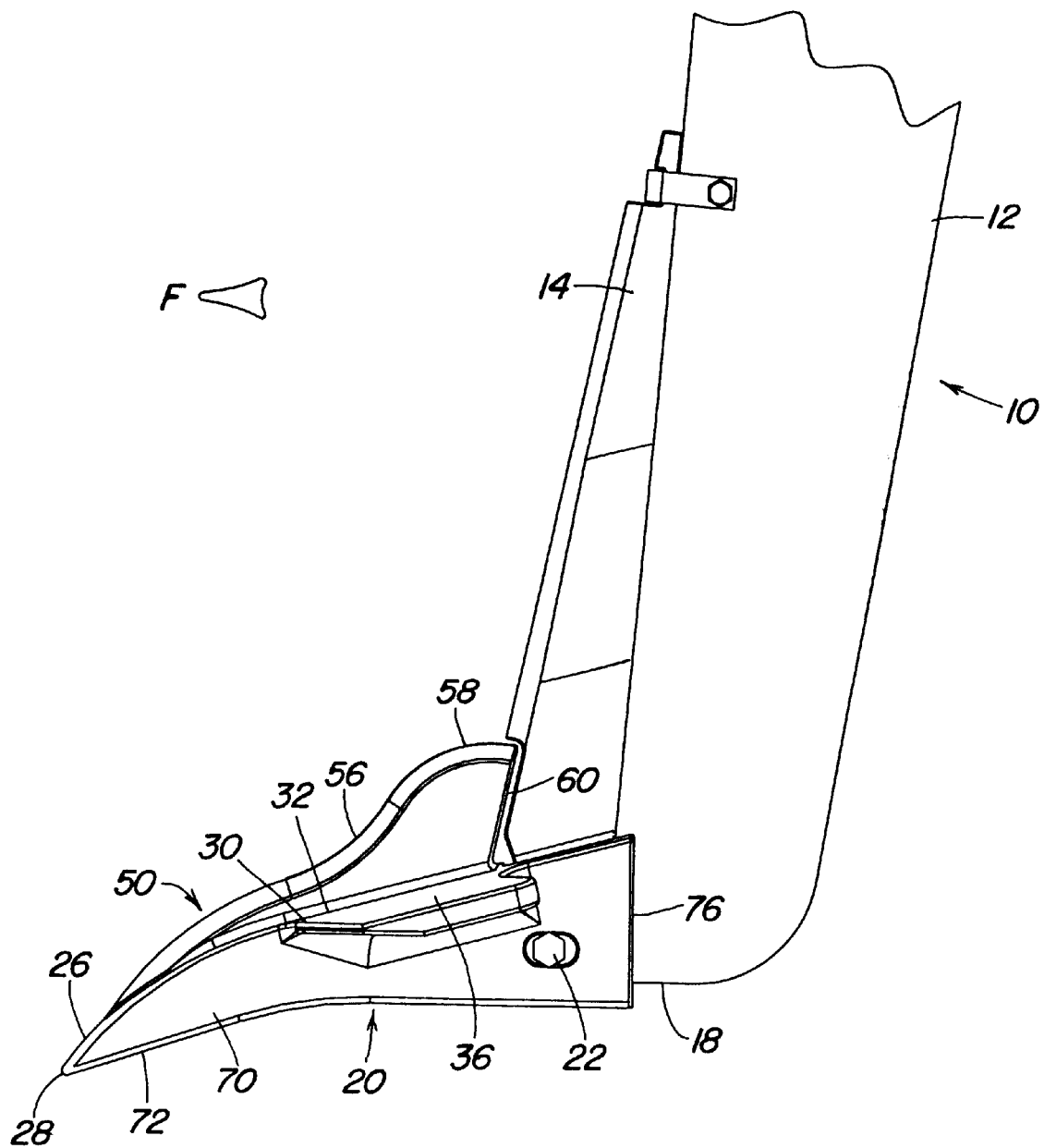
FIG. 1 is a side view of a portion of a ripper shank with a ripper point attached thereto.

Referring now to FIG. 1, therein is shown a ripper shank assembly 10 adapted for connection to an implement frame (not shown) in a conventional manner for forward movement (F) through the soil. The shank assembly 10 includes an upright support plate 12 having a width of at least 0.75 inches. The plate 12 has leading and trailing edges and supports a replaceable wear shin 14 at the lower end of the forward edge. The shin 14 has a width generally identical to that of the plate 12 and forms a natural extension of the plate sides. The support plate 12 includes a lower connecting end 18 which projects forwardly under the shin 14. The connecting end 18 is apertured and receives a replaceable ripper point 20 secured to the plate 12 by a bolt assembly 22 which is inserted through the aperture. The particular shank assembly construction is given by way of example only, and it is to be understood that the ripper point 20 can be used with a variety of shank constructions. The point 20 typically is supported for operating relatively deeply below the surface of the soil, for example, in the compaction layer, and at relatively high speeds.

Referring to FIGS. 1–4, which are drawn generally to scale, the ripper point 20 includes a narrow, elongated leading point portion 26 having a width no greater than approximately twice the width of the shank support plate 12 and, preferably, less than 1.5 inches. The point portion 26 includes a forwardmost edge 28 at the lowermost extremity of the point 20. The front edge 28 is slightly swept back (FIGS. 3 and 4) from the center.

Figure 4:
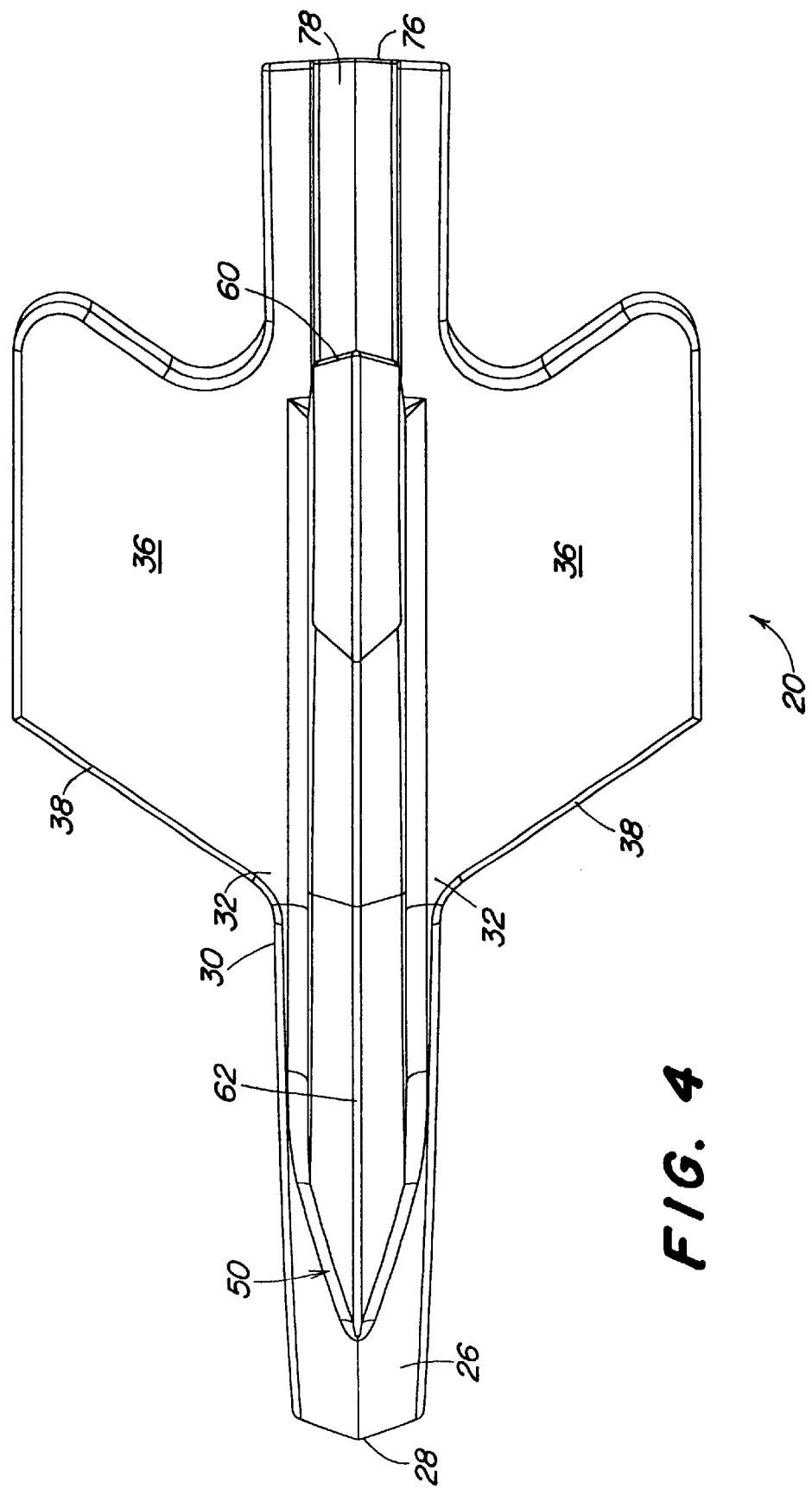
FIG. 4 is a top view of the ripper point of FIG. 1.

The top surface of the leading point portion 26 forms a relatively steep angle (see a of FIG. 2) in the range of approximately 40–50 degrees with the horizontal when the point is in the field working position as shown. The leading point portion 26 curves gently rearwardly with a large radius of curvature from the forward edge 28 to an intermediate portion 30 having a top surface 32 which extends at an angle (see b of FIG. 2) of less than approximately 20 degrees, preferably on the order of 15 degrees, relative to the horizontal. Wings 36 extend outwardly and slightly downwardly from the intermediate portion 30 and have a top surface which forms a natural continuation of the top surface 32 of the intermediate portion 30. The top surfaces of the wings 36 also form an angle of preferably less than about 20 degrees, preferably on the order of 15 degrees, relative to the horizontal. The wings 36 have a generally parallelogram shape with forward edges 38 which diverge rearwardly at an acute angle to the transverse direction, and parallel side edges 40 of substantial length to maintain generally constant point width and configuration as the forward edges wear rearwardly. The forward portions of the wings 36 are chamfered (FIG. 2) so a leading bottom portion 36c is generally horizontal in the working position of the point 20. As best seen in FIG. 4, the leading edges 38 of the wings 36 are offset a considerable distance behind the front edge 28. The offset between the edges 28 and 38 is generally greater than 4 inches and preferably on the order of 6 to 6.5 inches.

Figure 2:
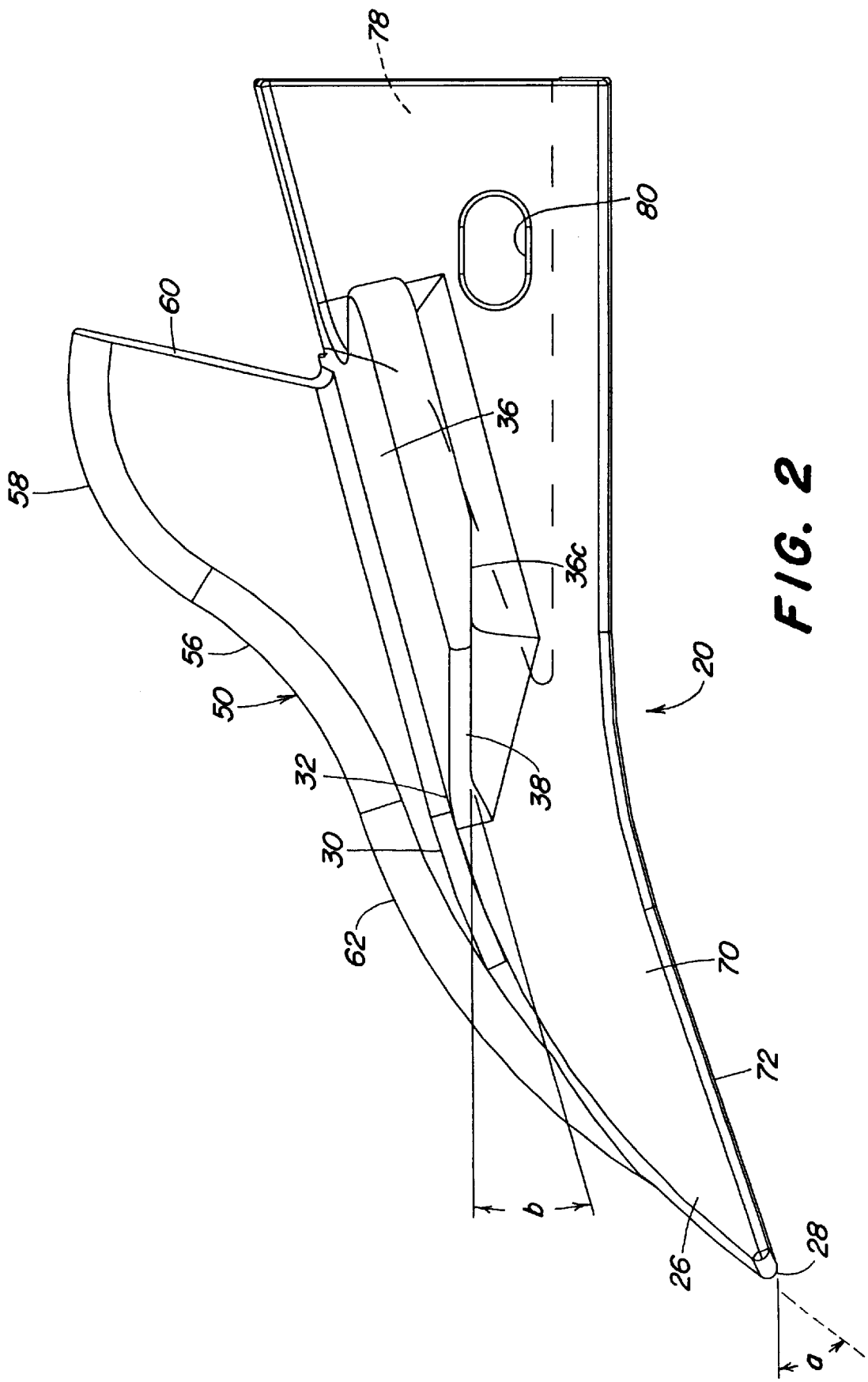
FIG. 2 is an enlarged side view of the ripper point of FIG. 1.
Figure 3:
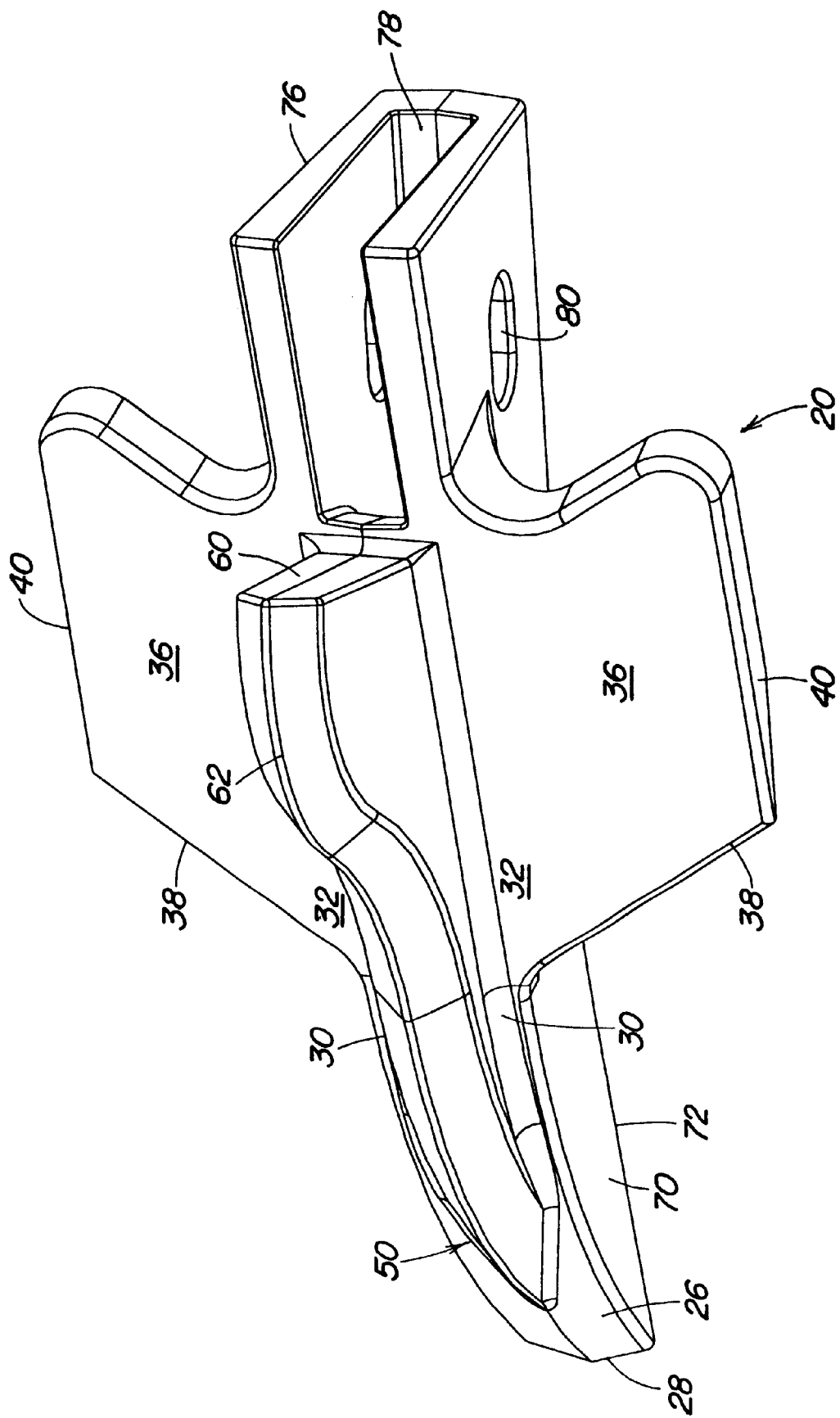
FIG. 3 is a perspective view of the point of FIG. 1.

A centrally located vertical fin 50 having a width of approximately half the width of the leading point portion 26, or the approximate width of the shank plate 12, extends upwardly from the leading point portion 26 rearwardly and above the forward edge 28 and forwardly of the leading edges 38 of the wings 36. The forward portion of the fin 50 projects a small distance above the top surface of the leading point portion 26 beginning at a location a substantial distance forwardly of the wings 36. The forward portion of the fin 50 is preferably more than 4 inches forwardly of the leading edges of the wings 36. As shown, with a 6 inch leading portion 26, the fin 50 rises from the portion 26 approximately 1 inch behind the front edge 28 and approximately 5 inches forwardly of the wings 36. Fin height increases in the rearward direction with the central portion of the fin 50 curving upwardly at a location 56 near the forward portion of the wings 36. From the location 56, the fin 50 curves rearwardly at location 58 and extends to a terminating surface or edge 60 generally aligned with trailing edges of the wings 36 and parallel to and generally abutting the leading edge of the shank assembly 14. The top of the fin 50 at the edge 60 is approximately 3 inches above the top surfaces of the wings 36. The top of the fin 50 is tapered and converges to a central location to define an upper edge or apex 62. The upper edge 62, as best seen in FIGS. 1 and 2, is gently curved and gradually increases in height from the leading point portion 26 to the edge 60.

The point 20 includes a lower body portion 70 having a bottom surface 72 which angles downwardly relative to the top surface of the leading point portion 26 to define side profile (FIGS. 1 and 2) which increases in height from the forward edge 28 to the intermediate portion 30. The bottom surface 72 extends rearwardly in generally a horizontal attitude at the intermediate portion 30 to a rearmost edge location 76 behind the rear edge 60 of the fin 50. The lower body portion 70 is notched at 78 (FIG. 3) to define a shank-receiving area generally behind and below the rear edge 60 of the fin 50. Apertures 80 in the sides of the notched area 78 receive the bolt structure 22 which attaches the point 20 to the lower end of a shank assembly 10. The sides of the notched area 78 embrace the sides of the connecting end 18 of the shank plate 12 and position the rear edge 60 of the fin 50 closely adjacent the front edge of the wear shin 14.

The construction of the leading point 26 provides good ground entry and vertical holding force in the compaction layer. The fin 50 pre-fractures soil and initiates substantial lateral displacement of the soil prior to the soil coming into contact with the wings 36. The fin 50 also parts the soil before the soil contacts the shank. The wings 36 lift the soil and provide additional fracturing above and outwardly of the point 20 for improved water penetration and retention and increased root growth. The point profile establishes the vertical force necessary to maintain a consistent working depth within the compaction layer.

The relatively shallow angle of the wings 36 limits soil surface disturbance in a variety of soil conditions. The narrow leading point 26, which is approximately half the width of a typical previously available point, also reduces soil surface disturbance. Further reduction of surface disturbance is achieved by the pre-fracturing action of the fin 50 in the compaction layer which reduces violent vertical eruption of the soil when contacted by the wings 36 and the shank assembly 10. Shank wear and drag are also reduced by the pre-fracturing action, which also improves lateral shattering for optimum soil profile.

The point is preferably cast from austempered ductile iron for long life. The length and aggressive downward and forward angle of the leading point portion 26, in addition to providing excellent penetration of hard or tight soils throughout the life of the point 20, is designed to wear out at the same time as the wings 36 in most soil conditions, thereby maximizing material utilization and providing consistent ripping performance for the entire wear life of the point. Although one wing width is shown in the drawings, it is to be understood that the wing widths may be greater or less than shown.

Having described the preferred embodiment, it will become apparent that various modifications can be made without departing from the scope of the invention as defined in the accompanying claims.

We claim:

1. A deep tillage point adapted for connection to a shank for forward movement through the soil, the point comprising: a leading point portion with a front edge and a top surface that forms a forward point angle in the range of approximately 40–50 degrees with the horizontal, an intermediate portion extending rearwardly from the leading point portion and including a top surface, wings having leading and trailing edges and extending laterally from the top surface, the wings defining a relatively shallow wing angle of less than approximately 20 degrees to the horizontal to limit upward movement of the soil, and a centrally located upright fin having a width less than the width of the leading point portion, the fin extending upwardly from the leading point portion at a location adjacent the front edge and forwardly of the leading edges of the wings and imparting substantial lateral movement of the soil prior to contact of the soil by the wings and limiting violent vertical eruption of the soil when contacted by the wings.

2. The point as set forth in claim 1 wherein the fin extends rearwardly to a location above the intermediate portion, the fin increasing in height above the intermediate portion in the rearward direction.

3. The point as set forth in claim 1 wherein the fin comprises an upper edge defining a plurality of gentle curves, the upper edge increasing in height in the rearward direction.

4. The point as set forth in claim 1 wherein the fin has a width approximately half the width of the leading point portion.

5. The point as set forth in claim 4 wherein the fin extends rearwardly from the leading point portion and terminates in a generally upright trailing edge adapted to abut or lie closely adjacent the shank.

6. The point as set forth in claim 1 wherein the leading point portion has a width less than 1.5 inches and the fin has a width approximately equal to half the width of the point.

7. The point as set forth in claim 1 wherein the leading point portion has a length greater than approximately 4 inches and a height which increases in the rearward and upward direction so that effective wear lives of the leading point portion and the wings are approximately equal.

8. The point as set forth in claim 1 wherein the forward edge is located at least approximately 6 inches forwardly of the leading edges of the wings.

9. The point as set forth in claim 7 wherein the wings have parallel, rearwardly extending sides to thereby maintain a constant effective working width substantially the entire wear lives of the leading point portions and the wings.

10. The point as set forth in claim 1 wherein the point angle is approximately 50 degrees, the wing angle in the fore-and-aft direction is approximately 15 degrees, and the wings have a slight downward tilt in the lateral direction.

11. The point as set forth in claim 8 wherein the fin includes a forward portion located at least 4 inches forwardly of the wings.

12. The point as set forth in claim 8 wherein the forward portion of the fin is located approximately 1 inch rearwardly of the forward edge.

13. A deep tillage point adapted for connection to a shank for forward movement through the soil, the point comprising: a leading point portion that forms a forward point angle greater than approximately 40 degrees with the horizontal, an intermediate portion extending rearwardly from the leading point portion and supporting laterally extending wings having leading wing edges, the wings defining a relatively shallow wing angle of less than approximately 20 degrees to the horizontal to limit upward movement of the soil, and a centrally located upright fin extending upwardly and rearwardly from the leading point portion and having a forwardmost portion located forwardly of the leading wing edges, the upright fin imparting substantial lateral movement of the soil prior to contact of the soil by the wings and limiting violent vertical eruption of the soil when contacted by he wings.

14. The deep tillage point as set forth in claim 13 wherein the leading point portion has a length greater than approximately 4 inches.

15. The deep tillage point as set forth in claim 14 wherein the fin extends upwardly from the leading point at a location at least approximately 4 inches forwardly of the leading wing edges.

16. The deep tillage point as set forth in claim 14 wherein the leading point portion has a width less than approximately 1.5 inches and the fin has a width approximately half the width of that of the leading point portion.

17. The deep tillage point as set forth in claim 13 wherein the fin extends continuously rearwardly over the leading point portion and the intermediate portion, the fin also including a generally upright trailing edge adapted to be positioned adjacent the shank.

18. A deep tillage point adapted for connection to a shank for forward movement through the soil, the point comprising: an elongated leading point portion angled downwardly in the forward direction, an intermediate portion angled rearwardly from the leading point portion, wings extending laterally from the intermediate portion and having leading wing edges, the wings defining an attack angle of less than approximately 20 degrees to the horizontal to limit upward movement of the soil, and a centrally located upright fin extending upwardly and rearwardly from the leading point portion, the fin having a forward portion offset forwardly of the leading wing edges directly above the leading point portion, and wherein upright fin imparts substantial lateral movement of the soil prior to contact of the soil by the leading wing edges and limits violent vertical eruption of the soil when contacted by the wings.

19. The tillage point as set forth in claim 18 wherein the forward portion of the fin is located at least 4 inches forwardly of the leading wing edges.

20. The tillage point as set forth in claim 18 wherein the leading point portion has a forward edge and an upper surface extending rearwardly and upwardly from the forward edge at an angle of at least 40 degrees to the horizontal, and wherein the forward surface has a width less than 1.5 inches and a length of at least 4 inches.

\* \* \* \* \*